United States Patent [19]

Snoy et al.

[11] 4,249,647
[45] Feb. 10, 1981

[54] FRICTION CLUTCH HAVING A CENTRIFUGALLY ACTUATED HYDRAULIC CONTROL VALVE

[75] Inventors: Joseph B. Snoy; Richard D. Preston, both of Rockford, Ill.

[73] Assignee: Twin Disc, Incorporated, Racine, Wis.

[21] Appl. No.: 8,347

[22] Filed: Feb. 1, 1979

[51] Int. Cl.³ .......................................... F16D 43/284
[52] U.S. Cl. ................................................ 192/103 FA
[58] Field of Search ........ 192/103 FA, 103 C, 105 A, 192/105 F, 106 F

[56] References Cited

U.S. PATENT DOCUMENTS

| | | | |
|---|---|---|---|
| 1,938,914 | 12/1933 | Kress | 192/103 FA |
| 2,325,814 | 8/1943 | Tyler | 192/103 FA |
| 2,613,772 | 10/1952 | Thurber | 192/105 F X |
| 3,155,208 | 11/1964 | Biabaud | 192/103 FA |
| 3,534,840 | 10/1970 | Snoy | 192/103 FA |
| 3,913,715 | 10/1975 | Groves | 192/103 FA |

Primary Examiner—Werner H. Schroeder
Assistant Examiner—Andrew M. Falik
Attorney, Agent, or Firm—James E. Nilles

[57] ABSTRACT

A hydraulically actuated friction plate type clutch having a centrifugally actuated valve for controlling the amount of modulation or engagement of the friction clutch, and apparatus such as a counterweight for counteracting the centrifugal force characteristics of the shiftable valve parts so that the capacity of the clutch remains substantially the same at all centrifugal speeds.

3 Claims, 7 Drawing Figures

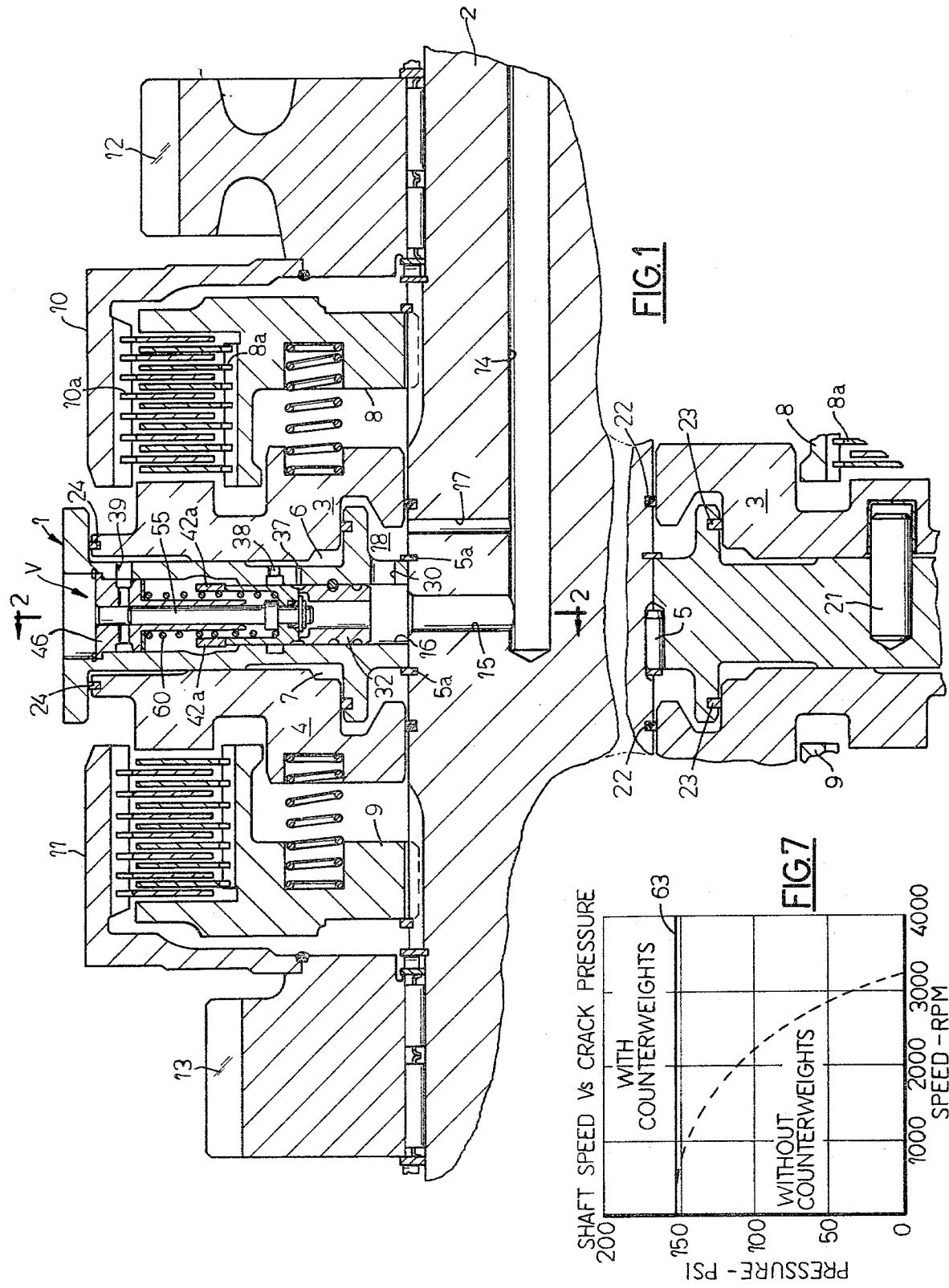

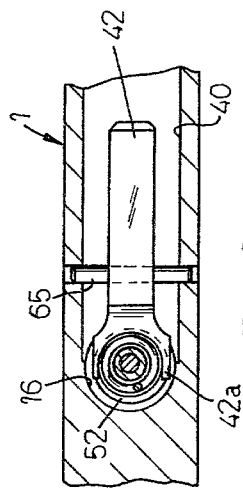
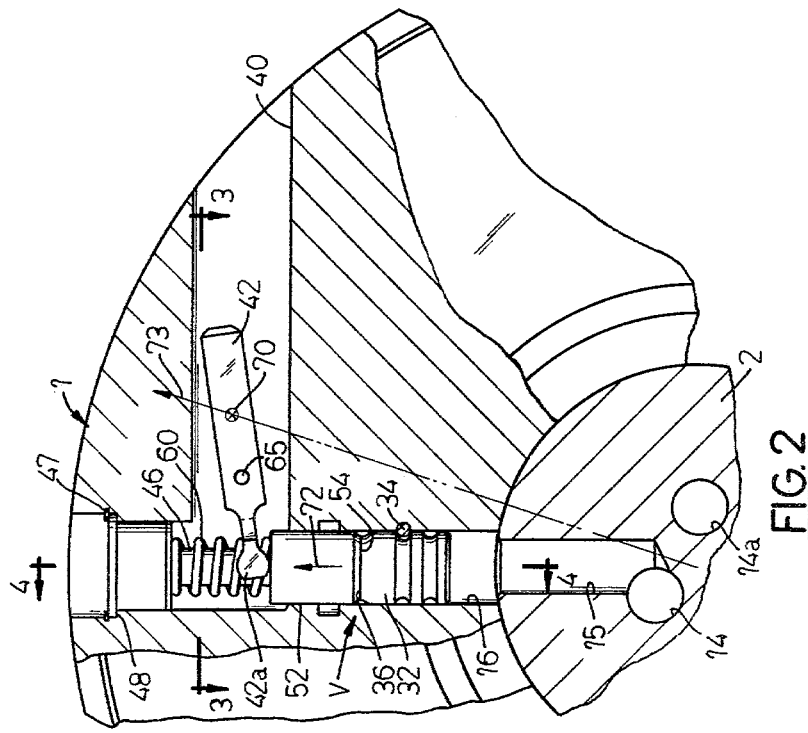
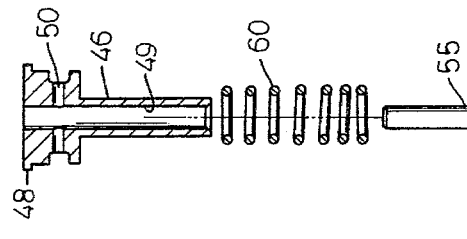
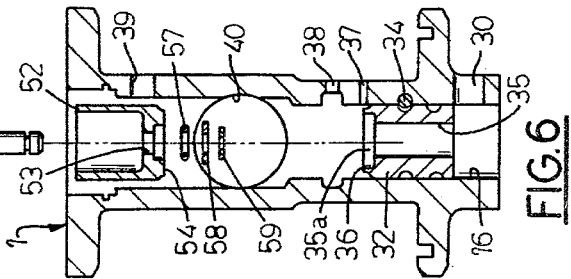
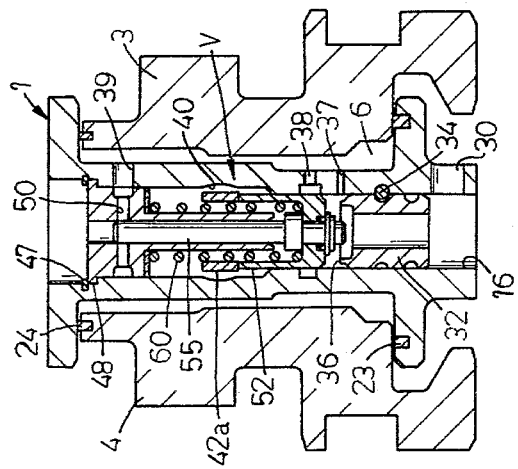
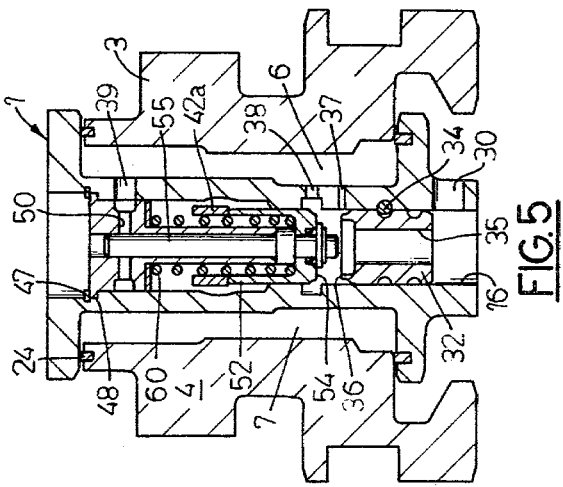

FRICTION CLUTCH HAVING A CENTRIFUGALLY ACTUATED HYDRAULIC CONTROL VALVE

BACKGROUND OF THE INVENTION

The invention pertains generally to hydraulically actuated friction clutches in which pressure fluid is supplied to a hydraulic cylinder to actuate the piston, the fluid being introduced from near the centerline of the clutch and directed radially outwardly where it enters the expansible fluid chamber formed by the cylinder and piston. These clutches thereby have a generally radially extending column of fluid which is subjected to centrifugal force and develops a considerable head acting on the piston, in excess of control pressure applied to the fluid. To balance or compensate for this centrifugal head of the column of fluid, various attempts have been made to solve this problem by the use of centrifugally operated valves such as shown in the U.S. Pats. to C. R. Hilpert Nos. 3,368,656 of Feb. 13, 1968; or 3,358,796 of Dec. 19, 1967. These devices worked very satisfactory for their intended purposes.

In addition, the following U.S. patents are also examples of prior art hydraulically actuated friction clutches having centrifugally operated valves for control thereof and in which the valve mass is affected by centrifugal force.

The Hilpert U.S. Pat. No. 3,578,120, issued May 11, 1971, entitled "Torque Transmission having Acceleration Responsive Fluid Control", utilizes various weights which are designed to be sensitive to angular acceleration and which operate on the centrifugal valves to control acceleration.

The Hilpert U.S. Pat. No. 3,352,395, issued Nov. 14, 1967, entitled "Friction Clutch having Centrifugally Operated Valve Means" utilizes compensating pins to provide stability to the control valve and without those pins the valve would be uncontrollable at certain conditions. These pins however do not counteract the centrifugal forces in the valve system, but do compensate for the change in centrifugal effect on the valve due to radial movement of the valve.

The Groves U.S. Pat. No. 3,913,715, issued Oct. 21, 1975, entitled "Modulatable Friction Clutch Controlled by a Centrifugal Force and Angular Acceleration Sensitive Valve", is somewhat similar to the above Hilpert U.S. Pat. No. 3,578,120, but this Groves patent has weights which are sensitive to both centrifugal force and angular acceleration. The centrifugal force component is used as a speed control and the angular acceleration component has a damping device and torque control.

The U.S. Pat. to Snoy No. 3,534,840 which issued Oct. 20, 1970 and entitled "Hydraulically Actuated Clutch Having A Two Piece Feed Back Dump Valve", by its nature is effected by centrifugal force acting on the mass of the valve parts which causes the clutch to have reduced capacity with increasing speed to a point, where at some speed the clutch has zero capacity. That patent does not have intentional centrifugal force sensitive or angular acceleration sensitive components.

All of the above patents have been assigned to an assignee common with the present invention.

The present invention is also an improvement in certain respects over the subject matter of the U.S. pending application Ser. No. 850,961 (Group 350) filed Nov. 4, 1977, which issued Feb. 5, 1980 as U.S. Pat. No. 4,186,829, of Schneider et al, which has been assigned to an assignee common with the present invention, and in which the trigger pressure falls off with an increase in rotational speed of the clutch.

SUMMARY OF THE PRESENT INVENTION

The present invention provides a modulatable, hydraulically controlled, friction type clutch including a centrifugal valve for modulating or varying the engagement of the friction clutch. More specifically, the clutch provided by the present invention has means for counteracting the centrifugal characteristics of the centrifugal valve, and the trigger pressure of the clutch remains the same at all rotational speeds. Still more specifically, the counteracting means for the valve parts is a pivoted weight member which counterbalances the weight of the shiftable valve parts so that constant operation of the clutch is assured as the rotational speed thereof increases, and the counter-balanced centrifugal valve for the hydraulic system results in constant valve characteristics at all rotational speeds.

These and other objects and advantages of the present invention will appear hereinafter as this disclosure progresses, reference being had to the accompanying drawings.

BRIEF DESCRIPTION OF THE DRAWINGS

FIG. 1 is a longitudinal, cross sectional view through a clutch and valve mechanism embodying the present invention, certain parts being shown as broken away for the sake of clarity and the control valve being shown in the closed position;

FIG. 2 is a transverse, cross sectional view taken generally along the line 2—2 in FIG. 1, certain parts being shown as broken away or in section for the sake of clarity;

FIG. 3 is a fragmentary, sectional view taken generally along the line 3—3 in FIG. 2;

FIG. 4 is an enlarged, cross sectional view taken generally along the line 4—4 in FIG. 2, but showing the control valve with one port to the clutch apply chamber being open;

FIG. 5 is a view similar to FIG. 4, but showing the valve element in the radially outward position when both supply ports to the clutch apply chamber are open;

FIG. 6 is an exploded view, for clarity, of certain of the valve parts shown in FIGS. 4 and 5; and FIG. 7 is a graph of pressure at which the valve will "crack" that is, lift from its seat and admit pressure fluid to the outer piston cavity, plotted against the rotational speed of the clutch; the dotted line showing the prior art characteristics, while the solid line shows the clutch characteristics with the present invention.

DESCRIPTION OF A PREFERRED EMBODIMENT

The invention has been shown as applied to a duplex clutch but of course it can also be used with a single clutch. The duplex clutch shown includes a central reaction member or a piston assembly housing 1 which is fixed on a shaft 2 by a dowel pin 5 (FIG. 1) and snap rings 5a in and around shaft 2, the housing 1 thereby being fixed on shaft 2 for rotation therewith. A pair of pistons 3 and 4 are slideable on the shaft, one on each side of the central reaction member defining therewith the actuating chambers 6 and 7. Clutch hub members 8 and 9 are fixed on the shaft by their respective splines and snap rings, and drums 10 and 11 are provided respectively for the hubs 8 and 9. Conventional interleaved clutch plates 8a and 10a are provided between and splined to the hub 8 and its drum 10, and similarly between hub 9 and its drum 11. The drums 10 and 11 each have a gear 12 and 13, respectively, fixed therewith, and the drums and their respective gears rotate freely on the shaft 2 on suitable roller bearings as clearly shown in FIG. 1. Clamp-up of the clutch plates causes rotation of corresponding gear with the shaft in the known manner.

Pressure fluid supply passages 14 and 15 are formed in shaft 2, extending radially to communicate with a passage 16 in housing 1 to conduct fluid pressure ultimately to the actuating chamber 6. FIG. 1 shows one centrifugal valve V for chamber 6 and its ring-like piston 3, it being understood that another similar valve (not shown) is also located in housing 1, the two valves being circumferentially spaced apart in housing 1, and the second valve communicating with chamber 7. The invention can be used with a single clutch as mentioned, and as the operation of the valves and their respective clutches are similar, only one will be described, namely valve V and in connection with chamber 6, piston 3 and the clutch shown at the right hand, as viewed in FIG. 1. Another, but smaller radial passage 17 places the pressure fluid passage 14 in direct communication with the small, radially inner annular chamber 18 for providing an initial and rapid clamp-up force on the clutch plates to thereby take up slack in the clutch disc pack when pressure fluid is admitted to passages 14. When the piston has clamped the clutch discs, the apply pressure continues to rise until the valve V is actuated, as will appear hereinafter, to pressurize the actuating chamber 6.

The actuating chambers 6 and 7 are thus selectively pressurized by their respective supply passages 14 and 14a (FIG. 2) in shaft 2 to cause extension of their piston and clamp-up of its adjacent clutch pack. A conventional dowel pin 21 (FIG. 1) is provided between each of the pistons and the housing 1, only one such pin 21 being shown. The pin 21 permits axial movement of its piston relative to the housing, but insures that the pistons rotate with the housing.

Suitable and conventional ring seals 22 are provided between the diameter of shaft 2 and the internal diameter of the pistons. Conventional ring seals 23 and 24 are also provided between the pistons and housing 1.

The shaft 2 is conventionally journalled for rotation in anti-friction bearing assemblies (not shown) and functions to transmit power between a power source and a driven or output member, (not shown) for example through gears 12 or 13. By way of further example, power can be furnished to the shaft from a power source such as an internal combustion engine, turbine, or other power source (not shown) and to a torque converter (not shown) downstream in the power transmission, where constant output capacity of the clutch is desired regardless of rotational speed.

Referring now in greater detail to the housing 1 in which valve V is located, the housing, as shown clearly in FIG. 6, defines the radially extending passage 16 and a port 30 which places passages 15 and 16 in direct communication with small chamber 18 for initial clamp-up of the discs. A valve seat member 32 is fixed by pin 34 in passage 16 and has a central passage 35 and counterbore 35a which forms a valve seat 36. Another small port 37 places passage 16 on the radial outer side of seat 36, in fluid communication with clutch apply chamber 6. A larger pressure apply port 38 also places passage 16 in communication with chamber 6.

The housing also has a chamber exhaust port 39 located radially outwardly and places chamber 6 in fluid discharging communication through the valve V, as will appear, to dump the chamber, thereby releasing the clutch engagement.

The housing 1 has a bore 40 (FIGS. 2, 3 and 6) extending transversely therein and through which the pivoted counterweight 42 extends and which will be more fully referred to.

Referring more specifically to the valve V itself, it includes a fixed sleeve 46 which is held in the passage 16 at its outer end by the snap ring 47 and its shoulder 48. A central passage 49 extends through the sleeve and a cross port 50 extends through the sleeve and places the central passage 16 in communication with the port 39 of the housing.

A shiftable valve element 52 which is of cup-shape and which has a central opening 53 therein is adapted to have its inner sealing surface 54 abut against the radially outer end of valve seat 36 of member 32, to thereby form a fluid seal. A valve stem 55 is fixed in fluid sealing engagement in the central passage 53 of valve seat member 52 by means of an o-ring 57 and washer 58, which are held captive on the stem 55 by a snap ring 59. Thus the shiftable valve seat member 52 and its stem 55 act as a shiftable valve element which can seal against the valve seat 32 to block pressure flowing into either ports 37 or 38. Normally the shiftable valve element is biased by the compression spring 60 against its seat to prevent pressurization of the clutch apply chamber 6. When the force of the pressure fluid is sufficient to cause the valve element to shift radially outwardly away from its seat, this pressure fluid then is admitted first to port 37 to commence pressurization of chamber 6. Thus the pressure fluid has caused the valve to "crack" the valve assembly off its seat 36. Due to the increased area of the valve now acted upon by the fluid pressure when the valve "cracks", the valve moves radially outwardly full stroke, causing the outer end of the stem 55 to shut off the outer exhaust ports 50 and 39 and also causing pressure fluid to be admitted to the clutch apply port 38 in the housing, thereby pressurizing chamber 6 and causing clamp-up or engagement of the clutch.

The shiftable valve element acts against the bias of the spring 60 due to centrifugal force as the rotational speed of the clutch increases. Consequently, with increasing rotational speed, less clutch apply pressure is required to "crack" the valve. At some point, the valve will completely overcome the bias of the spring 60, as shown by the drooping dotted line curve in FIG. 7. This causes clutch failure due to closing off of the outer exhaust ports 39 and 50 with resultant self-engagement of the clutch due to the trapped pressure fluid.

In radial position valve systems of the present type, the mass of the shiftable valve element is effected by centrifugal forces which cause the system characteristics to vary with the rotational speed of the parts, which in most cases is undesirable. In some installations, there is a centrifugal speed at which the forces acting on the valve mass would totally collapse the inward acting spring, resulting in detrimental effects as above mentioned.

In accordance with the present invention, the counterweight 42 is provided which presses radially inwardly on the shiftable valve part with a force equal to the centrifugal force on the shiftable valve part and this action produces the desirable flat curve 63 shown in FIG. 7. More specifically, the counterweight 42 is pivoted in the housing on the shaft 65 (FIGS. 2 and 3), the counterweight 42 being located in the bore 40. One end of the counterweight 42a of the counterweight 42 is bifurcated (FIGS. 1, 2, 3, 4 and 5) and bears against the shiftable valve element, more specifically against the outer end of element 52. As shown in FIG. 2, the pivot arm is designed so that its center of gravity or mass is concentrated at the right hand side of the pivot pin as viewed in FIG. 2; namely at point 70. When the clutch is in operation, centrifugal force urges the shiftable valve element in a radially outward direction as indicated by the small arrow 72 in FIG. 2. At the same time, centrifugal force acts in the direction indicated by the arrow 73 and through the center of gravity 70 of the counterweight and thus causing centrifugal forces acting on the counterweight to result in an inwardly acting force on the shiftable valve element which force exactly balances the centrifugal effects on the valve mass.

The result is a constant valve characteristic at all speeds. For some situations, the lever forces can be designed in any amount of over or under-balance if such conditions should be desired. In any event, the counterweight presses inwardly on the valve parts with a force equal to the centrifugal force on the valve parts and produces the desired flat curve 63 shown in FIG. 7. In this manner, the capacity of the clutch remains the same at all speeds.

We claim:

1. A hydraulically actuated friction clutch mechanism of the type having a rotatable housing which together with an axially slideable ring-like piston define an expansible clutch actuating chamber that is pressurizable to cause clutch engagement, said housing having a valve including a valve element generally radially slideable in said housing for controlling pressure fluid in said chamber, said shiftable valve element being subjected to centrifugal force when said mechanism is rotating to urge said valve element in a radially outward direction whereby centrifugal force on said valve element increases as the rotational speed of said mechanism increases, said valve element being shiftable to a radially inward closed position and a radially outward clutch actuating position, passage means defined by said mechanism for admitting pressure fluid to said valve at a location generally radially inwardly of said valve, and a counterweight shiftably mounted in said housing and having one end engagable with said shiftable valve element, centrifugal force also acting on said counterweight to urge the mass of said counterweight in an outward direction and which simultaneously urges said one end of said counterweight in a radially inward direction and against said shiftable valve element to thereby counter-balance the centrifugal force acting on said shiftable valve element whereby the capacity of the clutch mechanism remains substantially the same at all centrifugal speeds thereof.

2. A hydraulically actuated friction clutch mechanism comprising, a housing rotatable about an axis, a friction plate clutch, a piston axially slidable in said housing and defining therewith an expansible clutch actuating chamber that is pressurizable to cause engagement of said clutch; said housing having a valve including a valve element generally radially slideable in said housing for controlling pressure fluid in said chamber and being subjected to centrifugal force when said mechanism is rotating to thereby urge said valve element in a radially outward direction whereby centrifugal force on said valve element increases as the rotational speed of said mechanism increases, said valve element being shiftable to a radially inward closed position and a radially outward clutch actuating position; passage means defined by said mechanism for admitting pressure fluid to said valve at a location generally radially inwardly of said valve, and a counterweight having a pivotal mounting in said housing and having one end engagable with said shiftable valve element, the counterweight having a center of gravity located on the side of said pivotal mounting which is opposite to said one end of said counterweight, whereby centrifugal force acting on said counterweight urges the said center of gravity of said counterweight in an outward direction and thereby urges said one end of said counterweight in a radially inward direction against said shiftable valve element to counter-balance the centrifugal force acting on said shiftable valve element, whereby the capacity of the clutch mechanism remains substantially the same at all centrifugal speeds thereof.

3. A hydraulically actuated friction clutch mechanism comprising, a rotatable shaft, a housing securing on said shaft for rotation therewith, an axially slideable piston mounted on said shaft, a friction plate clutch carried on said shaft, said housing and said piston defining an expansible clutch actuating chamber that is pressurizable to cause engagement of said clutch, pressure fluid passage means in said shaft and said housing, said housing having a valve in said passage means and including a valve element generally radially slideable in said housing for controlling pressure fluid in said chamber, said shiftable valve element being subjected to centrifugal force when said mechanism is rotating to urge said valve element in a radially outward direction whereby centrifugal force on said valve element increases as the rotational speed of said mechanism increases, said valve element being shiftable to a radially inward closed position and a radially outward clutch actuating position, said passage means admitting pressure fluid to said valve at a location generally radially inwardly of said valve, and a counterweight having a pivotal mounting in said housing and having one end engagable with said shiftable valve element, the counterweight having a center of gravity located on the side of said pivotal mounting which is opposite to said one end of said counterweight, whereby centrifugal force acting on said counterweight urges said center of gravity of said counterweight in an outward direction and thereby urges said one end of said counterweight in a radially inward direction against said shiftable valve element to counter-balance the centrifugal force acting on said shiftable valve element, whereby the capacity of the clutch mechanism remains substantially the same at all centrifugal speeds thereof.

* * * * *